July 23, 1963 H. B. McLEOD 3,098,501
REGULATING VALVE
Filed Oct. 5, 1961
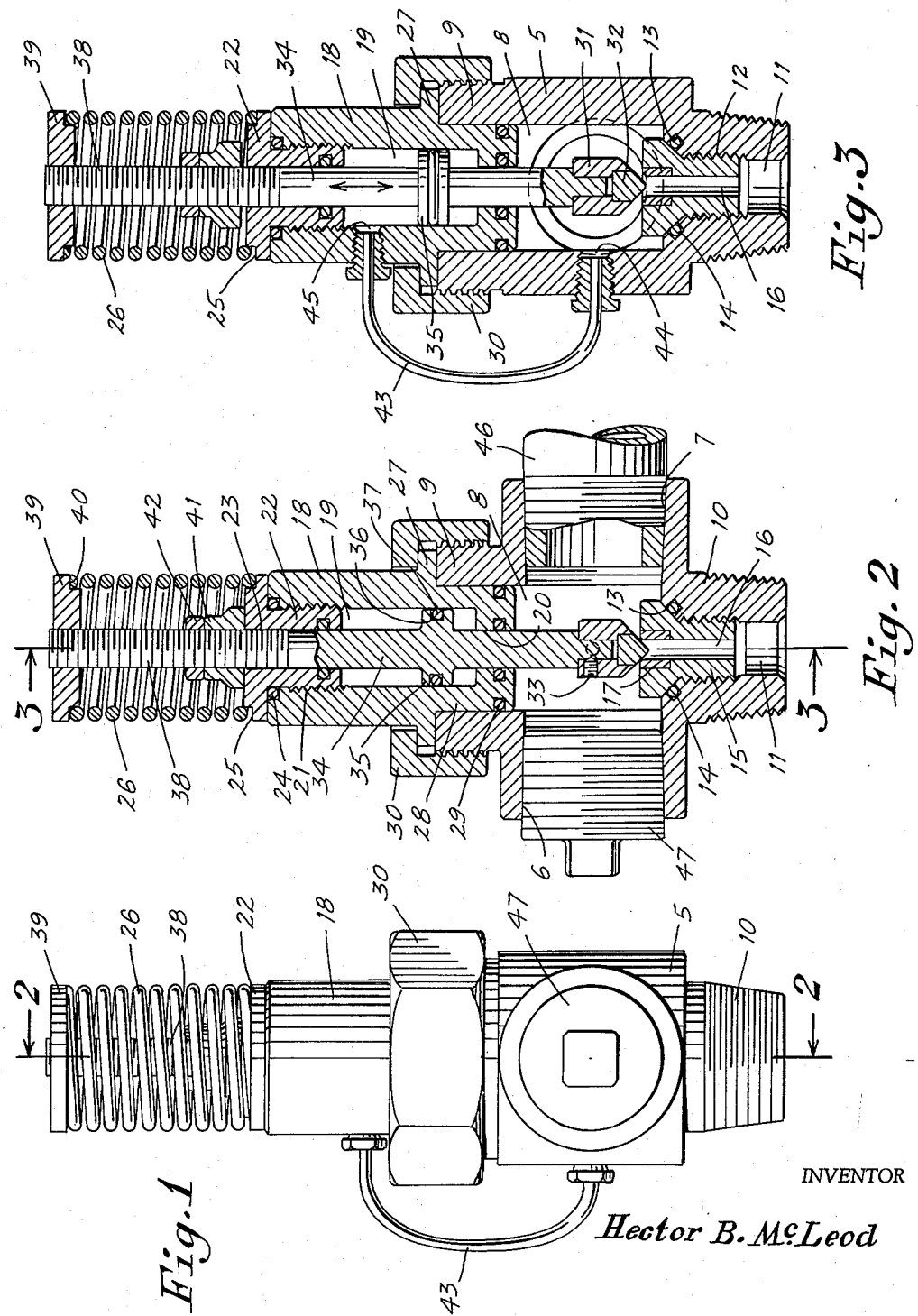
INVENTOR
Hector B. McLeod

3,098,501
REGULATING VALVE
Hector B. McLeod, 3285 Highland Ave., Beaumont, Tex.
Filed Oct. 5, 1961, Ser. No. 143,087
1 Claim. (Cl. 137—505.13)

This invention relates generally to valve structure, and is more specifically directed towards a choke valve for regulating the output of a line subject to varying pressure such as an oil well.

It is a principal object of this invention to provide an improved valve or choke for controlling the output of a liquid issuing through a pipe such that a certain minimum volume of liquid may flow regardless of the pressure conditions existing.

Another object of the invention is to provide a regulating valve which automatically compensates for varying pressure on the input side of the valve, so as to permit a constant output to be maintained under fluctuating input conditions.

It is yet another object of the invention to provide a regulating valve which may be used for tapping a supply of oil from a line subject to fluctuations in pressure.

Briefly, the invention comprises the provision of a T-pipe fitting for connection intermediate the length of a continuous pipe or at one end thereof. Disposed inwardly of the central outlet of the pipe fitting is a valve seat which cooperates with a valve adjustably movable axially of the seat opening, and projecting outwardly through the pipe body to communicate with a pressure control cylinder. The valve stem mounts a piston for actuation within the cylinder and extends outwardly through adjustable bushings for spring loaded adjustment and for selectively locking the ingress of the valve relative to the valve seat. A pressure equalizing pipe communicates between the pipe and the cylinder so as to maintain pressure on the piston equal to that within the fitting.

A full understanding of the construction of this invention, together with further novel features and advantages, will be had from the following more detailed description of a preferred embodiment thereof, taken in conjunction with the attached drawings wherein:

FIG. 1 is a front elevation of the pressure regulating valve which comprises my invention.

FIG. 2 is a cross sectional side elevation of the device taken along the line 2—2 of FIG. 1.

FIG. 3 is a cross sectional front elevation of the device taken along the line 3—3 of FIG. 2.

Similar reference characters indicate corresponding parts throughout the several views in the drawing.

Referring now to the drawings in detail, the numeral 5 represents the main body of the valve which presents opposed threaded pipe openings 6 and 7 communicating centrally through the body. A vertical cylindrical opening 8 extends centrally of the body intermediate the threaded pipe openings 6 and 7 and terminates upwardly with a threaded cylindrical flange 9. At the base of the cylindrical opening 8 is a male output fitting 10 having a concentric bore 11 formed therethrough communicating with the said opening 8. A threaded counterbore 12 is formed at the inner end of the bore 11 at which point it is suitably provided with a conical opening 13 mounting a suitable O-ring 14. A valve seat 15 threadably engages in the counterbore 12 so as to effectively seal with the O-ring 14, and is provided with a concentric opening 16 therethrough suitably sleeved at 17 to provide a valve seating surface.

A cylindrical body 18 has a concentric bore 19 restricted at one end by a small bore 20 formed concentrically therewith. The other end of the bore 19 is threaded at 21 to receive a flanged bushing 22 having a smaller bore 23 formed therethrough in alignment with the bore 20. The bushing 22 is sealed within the bore by means of a suitable O-ring 24 and is formed with an annular recess 25 about the outer side of the flange portion for the purpose of mounting one end of a coil spring 26. The cylindrical body 18 has an outwardly extending flange 27 which seats on the end of a threaded flange 9, and also has a turned end 28 which engages in the upper end of the cylindrical opening 8 of the body 5, it being suitably sealed with respect thereto by an O-ring 29. A threaded cap 30 engages over the threaded cylindrical flange 9 and clampingly retains the radial flange 27 in abutment with the end of the flange 9.

A valve 31 having a conically tapered insert 32 for engaging with the valve seat 15 is removably mounted by means of a grub screw 33 on the lower end of a valve stem 34. Intermediate the length of the valve stem 34 is a concentric piston flange 35 which cooperates longitudinally of the cylindrical bore 19 and is provided with an annular groove 36 for retaining a sealing ring 37 for engagement with the wall of the bore 19. The valve stem extends through the bore 20 and outwardly through the bore 23 to terminate with a threaded portion 38 which is engaged by an adjustable clamp 39 having an annular recess 40 for receiving the opposite end of the coiled compression spring 26. A threaded stop member 41 cooperates with a lock nut 42 and engages with the threaded portion 38 of the valve stem for adjustable abutting relationship with the outer face of the bushing 22. It will be appreciated that this stop member adjustably controls the minimum opening between the valve 31 and the valve seat 15.

A pressure pipe 43 communicates through an opening 44 in the body 5 providing access into the cylindrical opening 8. The pipe extends in an arcuate manner and terminates through an opening 45 providing access into the bore 19 in a spaced manner above the position of the piston flange 35. Liquid pressure present in the cylindrical opening 8 is thus introduced into the upper end of the bore 19 for the purpose of transmitting fluctuations in the pressure to the said bore for actuation against the upper side of the piston flange 35. An input pipe 46 is threaded into the opening 7 in the body, as shown in FIG. 2, of the drawing, and in this instance, a closure plug 47 sealingly engages in the remaining opening 6 of the body.

In operation, fluctuation in oil pressure present in the pipe 46 will be transmitted through the pressure pipe 43 into the bore 19 thereby controlling the axial position of the valve stem 34 by reaction with the piston flange 35. The degree of such reaction may be adjusted by the degree of compression applied to the end of the valve stem by means of the compression spring 26 which is readily adjusted by movement of the cap 39 disposed on the threaded end of the stem. A minimum clearance between the valve insert 32 and the valve seat 15 is determined by the position of the stop member 41 which abuts with the top of the bushing 22 and is locked in the desired setting by means of the lock nut 42. In this way, a constant flow of liquid will issue through the bore 11 for distribution as desired.

Having described the invention in a preferred form, it will be appreciated that some modifications may be made to the precise configuration, without departing from the scope or spirit of the invention, as defined by the following claim.

I claim:

A pressure regulating valve, comprising, a body having axially aligned opposed openings therein, there being a substantially unrestricted communication therebetween, a transverse bore extending through the body intermediate the said openings, an output fitting disposed normally with the openings and aligned with the bore, a valve seat secured in the output fitting inwardly of the bore, a cylindrical body having a concentric bore secured in one end of the transverse bore, said concentric bore communicating with the transverse bore through a smaller concentric bore, a valve cooperating with the valve seat and having a stem extending through the smaller concentric bore and outwardly beyond the open end of the concentric bore to terminate with a threaded end portion, a piston flange mounted about the stem and cooperating with the sides of the concentric bore, spring means adjustably urging said valve away from the valve seat, and a pressure pipe communicating between the transverse bore and the concentric bore such that liquid pressure introduced into the transverse bore will be exerted against a face of the piston flange within the concentric bore such that an increase in pressure effects movement of the valve in a closing direction and thereby control of the flow outwardly between said valve and said valve seat, said aligned openings adapted to pass liquid through said transverse bore in a substantially unrestricted manner, and an adjustable threaded stop member threadably mounted on a protruding portion of the valve stem, a bushing closing the open end of said concentric bore, said stop member selectively abutting with the exterior of said bushing, said spring means being disposed over the protruding portion of the valve stem, and an adjustable clamp threaded on the valve stem to retain said spring means against the exterior of said bushing.

References Cited in the file of this patent

UNITED STATES PATENTS

| | | |
|---|---|---|
| 531,304 | Dousman | Dec. 25, 1894 |
| 2,027,762 | Becker | Jan. 14, 1936 |
| 2,899,980 | Loebel | Aug. 18, 1959 |
| 2,955,614 | Meynig | Oct. 11, 1960 |